United States Patent [19]

Ledbetter, Jr. et al.

[11] Patent Number: 5,485,602
[45] Date of Patent: Jan. 16, 1996

[54] INTEGRATED CIRCUIT HAVING A CONTROL SIGNAL FOR IDENTIFYING COINCIDING ACTIVE EDGES OF TWO CLOCK SIGNALS

[75] Inventors: William B. Ledbetter, Jr., Austin, Tex.; Daniel M. McCarthy, Phoenix, Ariz.; James G. Gay, Pflugerville, Tex.

[73] Assignee: Motorola, Inc., Schaumburg, Ill.

[21] Appl. No.: 172,985

[22] Filed: Dec. 27, 1993

[51] Int. Cl.⁶ .................................................. G06F 1/04
[52] U.S. Cl. ............................................................ 395/550
[58] Field of Search ............................................... 395/550

[56] References Cited

U.S. PATENT DOCUMENTS

5,086,427  2/1992  Whittaker et al. .................. 370/85.1
5,261,081  11/1993  White et al. .......................... 395/550

Primary Examiner—Thomas M. Heckler
Attorney, Agent, or Firm—Keith E. Witek

[57] ABSTRACT

A data processing system receives a CLK signal for performing operations internal to a data processor (10). The data processor (10) has a CPU (12) which performs operations in response to the CLK signal. The bus is allowed to operate at a frequency which is less than or equal to the operational frequency of the CLK. The bus clock is typically either equal to the clock in frequency or runs at one-half or one-quarter speed. A CLKEN* signal input to the processor (10) is asserted to indicate an active edge of the external bus clock and synchronize the active edge of the external bus clock with an active edge of CLK to allow an active edge of CLK to perform bus operations which coincide with the active edge of the external bus clock. In another form, an internal counter/control circuit (20) may be used internal to the processor (10) to generate internal CLKEN* signals.

27 Claims, 4 Drawing Sheets

INTEGRATED CIRCUIT HAVING A CONTROL SIGNAL FOR IDENTIFYING COINCIDING ACTIVE EDGES OF TWO CLOCK SIGNALS

FIELD OF THE INVENTION

The present invention relates generally to semiconductor circuits, and more particularly, to bus control and bus clock signals.

BACKGROUND OF THE INVENTION

It is important for a micro-processor unit (MPU) to support bus frequencies that are slower then the processor (MPU) frequency. This feature allows the design of systems with both a low frequency bus to maintain low cost and power and a high frequency processor for high performance, two clock functions are required.

To provide this feature, a method is needed to generate the processor clock, the bus clock and to set the processor to external bus clock relationship. It is desirable for this method to work across as wide a range of frequencies as possible. For today's MPUs, this can mean supporting processor frequencies from 100 MHz plus to near 0 Hz operation. External control of this operation can provide added flexibility.

There are several ways to provide the functionality described above. One is to use two unrelated clock generators of different frequency, the slower for the bus clock and the faster for the processor clock. Communication between the processor and the bus can be done by synchronizing the necessary signals between the processor and the bus. This method has the advantage of not fixing the processor to bus clock relationship. However, synchronization is normally accomplished by serially registering a signal from the driving frequency domain several times (at least two) in registers clocked at the frequency of receiving frequency domain. A performance penalty results from this added latency. Also, if the synchronization process is done on the MPU, both clocks must be present on the MPU.

A second way to provide the functionality described above is to generate two clocks with both a fixed frequency and a fixed phase relationship. This is normally accomplished by a phase locked loop (PLL) circuit. The higher frequency clock is used for the processor clock and the lower frequency is used in the bus control logic that interfaces to the external bus.

There are several design decisions and costs associated with this methodology. First, the phase relationship between the two clocks must be tightly controlled. This adds to the complexity and cost of the PLL. Second, PLLs can not operate over a large frequency range. This limits the application of this technique to this frequency range. Also, PLLs take time to achieve phase/frequency lock to the input reference. This means for systems that desire to stop the clocks for low power modes, there is a time penalty to restart the clocks to allow the PLL to achieve steady-state operation.

If the PLL design is left to the system designer, then the part must input both the bus and processor clock. Careful attention is needed to insure that the clock distribution networks inside the MPU do not create excessive skew between these clocks. If the PLL is put on the MPU, then the MPU designer is faced with designing the PLL. A PLL requires different circuit design techniques and considerations than normal digital circuits and must be carefully isolated from other circuits on the chip for correct operation of both the PLL and the digital MPU logic.

All the above solutions have costs, complexities and/or operational restrictions. The current invention provides the desired functions and operating frequencies with lower costs and complexities and without operation frequency restrictions.

SUMMARY OF THE INVENTION

The previously mentioned disadvantages are overcome and other advantages achieved with the present invention. In one form, the present invention comprises a method for using a single clock signal to control a processor at a first frequency and bus operations at a second frequency within a data processor. The method begins by receiving the single clock signal from external the data processor. The clock signal operates at the first frequency and has active edges. A control signal is received from external to the data processor. The control signal is used to indicate which active edges of the single clock signal are used to perform bus operations. The active edges of the clock signal which are used to perform bus operations resulting in the second frequency wherein the second frequency is less than or equal to the first frequency.

In another form, the invention comprises an integrated circuit having at least one terminal for accessing a bus. The integrated circuit has a terminal for receiving a clock signal and a terminal for receiving a clock qualifier signal. The clock signal has a plurality of active clock edges. The clock qualifier signal is asserted to indicate at least one active clock edge in the plurality of active clock edges, wherein the at least one active clock edge in the plurality of active clock edges is used to indicate when the integrated circuit is to perform bus operations external to the integrated circuit.

The present invention will be more clearly understood from the detailed description below in conjunction with the accompanying drawings.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

Figure 5:
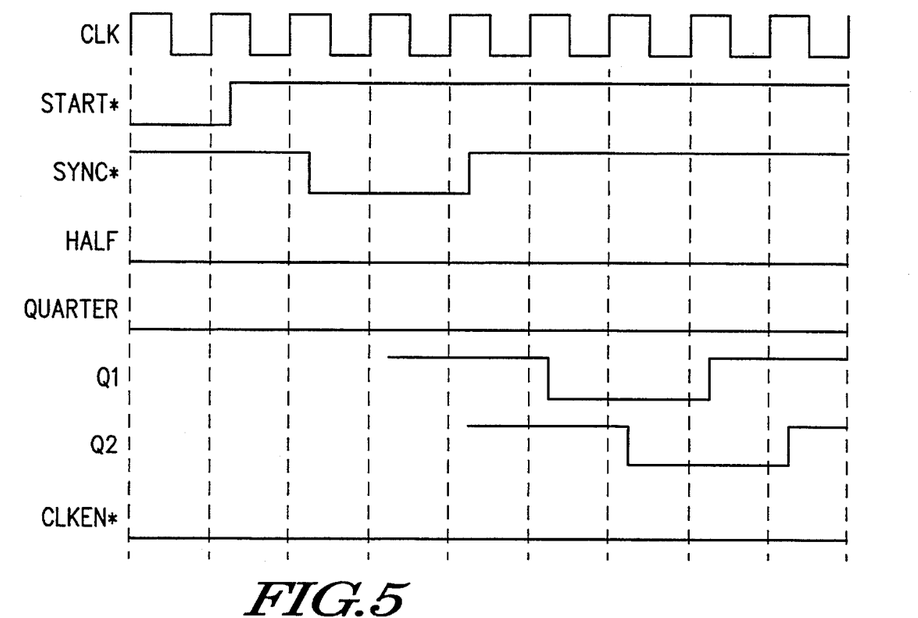
FIG. 5 illustrates, in a timing diagram, a bus operating at full microprocessor clock speed in accordance with FIG. 4.
Figure 6:
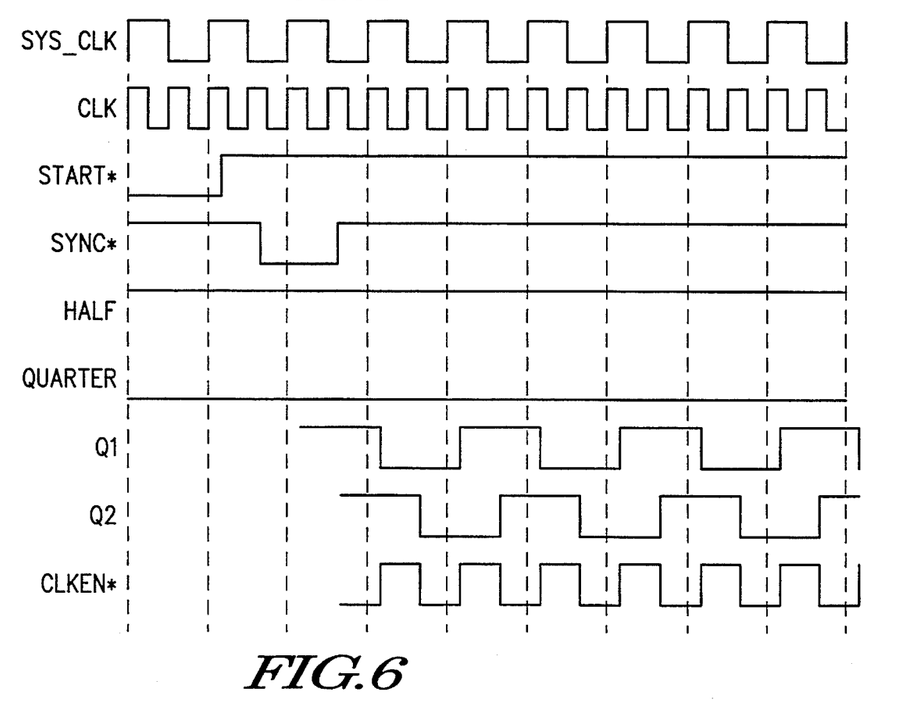
FIG. 6 illustrates, in a timing diagram, a bus operating at half microprocessor clock speed in accordance with FIG. 4.
Figure 7:
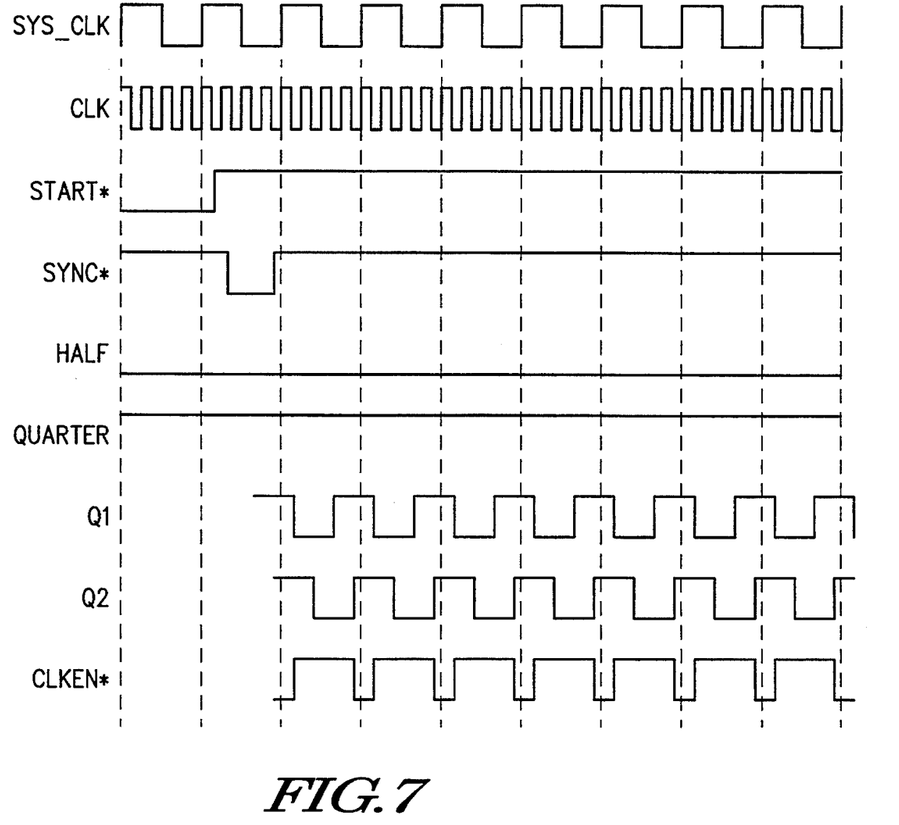
FIG. 7 illustrates, in a timing diagram, a bus operating at one-quarter microprocessor clock speed in accordance with FIG. 4.

In the timing diagram FIGS. 5–7, signals which are not drawn as either high, low, or tri-stated, are unknown during those time periods.

DESCRIPTION OF A PREFERRED EMBODIMENT

Known microprocessor units (MPUs) employ many different methods to support varied bus clock to processor clock ratios. The method and apparatus discussed below is superior to existing methods because it provides a wider range of ratios, has more flexible clocking control, and does not use a phase lock loop (PLL) or voltage controller oscillator (VCO).

In the integrated circuit industry, it is important for an MPU to support bus frequencies that are slower than the processor frequency. This feature allows the design of systems with a low frequency bus to maintain low cost while the system utilizes a high frequency processor for high performance.

To provide this feature, a method is needed to set the processor clock to external bus clock relationship. This method should work across as wide a range of processor frequencies as possible. For today's MPU, this can mean supporting processor frequencies from 100 MHz or more to near 0 Hz (DC) operation. External control of this operation can provide added flexibility.

The method and apparatus described herein allows a data processor to support bus clock periods that can be any integer multiple of the processor clock period. In other words the bus clock frequency may be any numerical factor of the data processor clock frequency. For example, if a processor clock frequency is 50 Mhz, then the bus operations may occur at 50 MHz, 25MHz, 12.5 MHz, 6.25 MHz, etc.. In another form, random, pseudo-random, or any pattern of clock edges which correspond to the data processor clock edges may be used as an active clock edge for bus operation. For example assume a data processor has a clock signal having rising edges numbered in rank order from 1 to 20. Then the bus may use clocks 2, 6, 7, 13, 18, and 19 to perform bus operations and not simply periodic numbered edges such as 2, 4, 6, 8, etc. The above operation is supported for all processor frequencies from 0 Hz to the maximum specified processor frequency and this operation is controlled by an external pin labeled CLKEN* herein.

In summary (see FIGS. 1–4), this invention consists of a new input signal and control logic in a data processor's bus control unit to support lower bus frequency operation than the clock of the data processor. The new input signal, CLKEN*, is used by the bus control unit of the data processor to provide correct bus operation at an external bus clock frequency which is less than or equal to the data processor clock frequency. The processor clock pin (CLK) on the data processor, and the external bus clock (operating at a frequency less than or equal to the data processor CLK) must be synchronized. Specifically, the external bus clock can be any integer multiple of the processor clock period or a non-periodic clocking signal (as discussed above). All functional units of the data processor, including the bus control unit, use the processor clock for all registers while bus operations (and operations, such as external reads and writes, between the CPU and the bus logic) are timed to coincide with the external bus clock via active edges of the CPU clock.

The above clocking function operates as follows (see FIGS. 5–7 wherein full, half, and one-quarter bus-to-processor speed is illustrated). The CLKEN* signal is asserted before the rising edge of the processor clock that coincides with the rising edge of the external bus clock. The CLKEN* signal is negated before all rising edges of the processor clock that do not coincide with a rising edge of the external bus clock. Note that for the case of bus frequency equal to the processor frequency, the CLKEN* pin must be continuously asserted, thereby selecting all processor clock edges in a one-to-one ratio to the bus clock edges. The ratio of the bus to processor clock need not be a power of two such as half or quarter as illustrated herein, instead the relationship of processor clock, external clock, and the CLKEN* signal for the case of a bus clock period of three or five times the processor clock period is possible. The ratio of the processor clock frequency to the bus clock frequency must be an integer when the bus clock is periodic (i.e. 24/6 is quarter speed 24/8 is one-third speed, 24/12 is half speed, 24/24 is full speed, 24/2.4 is one-tenth speed, etc.).

For all MPU external signals, all bus control signals, address signals, data signals, etc., the CLKEN* signal is used to output and receive these signals at the bus clock frequency by enabling specific edges of the data processor clock. In other words, the CLK clock edges enabled by the CLKEN* signal are edges corresponding to the external bus clock signal, and the bus may perform operations primarily in response to the processor clock edges enabled via CLKEN*. Output signals will then change state only when a rising edge of the processor clock is enabled by the CLKEN* signal. Since this coincides with the rising edge of the external bus clock, the output signals of the processor are synchronized with the rising edge of the external bus clock.

For all externally input signals to the MPU, the CLKEN* signal is used as a qualifier for CLK. Input signals are logically ANDed with the CLKEN* signal and then sampled on the rising edge of the processor clock. Therefore, inputs will be seen as valid in the processor only when the CLKEN* signal is asserted. Since this coincides with the rising edge of the external clock, input signals are valid only on rising edges of the external clock. Input signals are negated on all rising edges of the processor clock that do not coincide with the external clock. It is important to note that active edges are referred to herein, and active edges may be either rising edges, falling edges, or a combination of both rising edges and falling edges, although rising edges are preferred/discussed herein.

Figure 1:
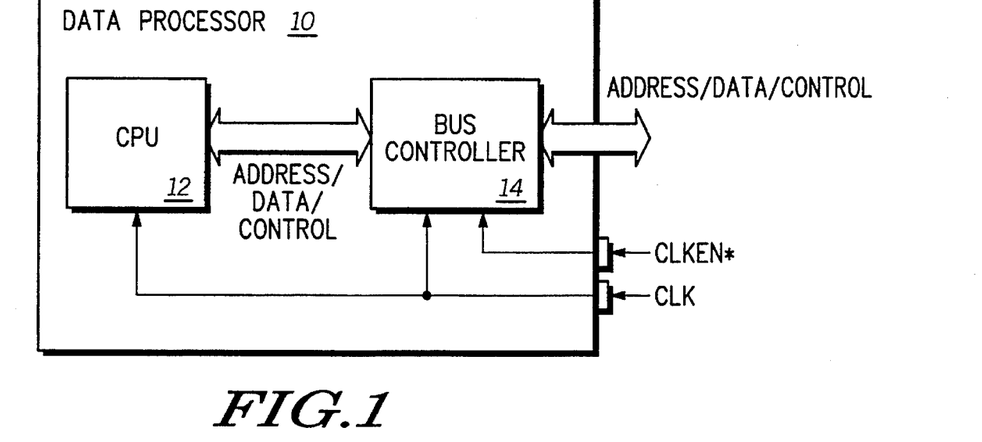
FIG. 1 illustrates, in a block diagram, a data processing system in accordance with the present invention.

Therefore, in FIG. 1, the bus interface unit (BIU) or bus controller 14 couples the processor (or central processing unit [CPU]12) operation which operates at a first clock frequency (CLK) to the external bus operation operating at a same or slower frequency than the first clock frequency (CLK). The output signals of the processor 10 change state only on the rising edge of the external clock and are stable between these edges. External bus logic sees the processor bus interface operate at its frequency and synchronized to its clock, allowing the external bus to operate correctly. Internal processor logic sees bus inputs change state on the rising edge of the processor clock enabled by the CLKEN* signal which coincides with the rising edge of the external bus clock and then negate on the next rising edge of the processor clock if CLKEN* is not asserted. The processor (CPU 12) sees the bus interface operate at its frequency with idle bus cycles whenever a rising edge of the processor clock is not enabled by CLKEN*.

Overall, the above apparatus and method allows a processor clock and processor bus clock structure to control the operation and relation of the processor and bus clocks such that the processor frequency may be any multiple of the bus frequency. The above design provides this control using one pin for the processor clock (CLK) and one pin for a bus interface clock enable (CLKEN*). The design discussed herein provides this range of frequency relationships without a VCO or PLL and with relatively loose timing constraints on the bus interface clock enable pin. The design, in general, provides for the following:

1) The bus period may be any integer multiple of the processor period or a random/pseudo-random pattern.
2) The design uses one pin, CLKEN*, for a bus interface clock enable.
3) The design provides correct operation at any processor frequency.
4) The design provides this range of frequency relationships without a VCO or PLL.
5) Provides relatively loose tinting constraints on the bus interface clock enable pin.

The invention may be more readily understood with reference to FIG. 1–7.

FIG. 1 illustrates a CPU 12 coupled to a bus controller 14 within a data processor 10. The CPU 12 or data processor 10 may be a memory device (such as a SRAM, a DRAM, a EEPROM device, an EPROM device, a flash device, and the like), an interface device, any peripheral device, a DMA device, a communication device, a timer, analog circuitry, a microprocessor, a pipelined execution device, an application specific integrated circuit (ASIC) device, a programmable logic array (PLA), hard-wired logic, an execution unit at least partially software driven by microcode and/or nanocode, a plurality of execution devices, a digital signal processor (DSP), a computer, any data processor, any central processing unit (CPU), an integrated circuit, and/or the like.

A CLK signal in FIG. 1 is input from external to the processor 10 or generated within the processor 10 to control and synchronize operations within the processor 10. A CLKEN* signal (clock enable signal—"*" meaning active low) is used to synchronize the CLK signal to an external bus clock (not illustrated in FIG. 1). When CLKEN* is asserted, one or more active edge of the CLK signal is identified. This identified active edge of the CLK signal (either a falling or rising edge, but preferably a rising edge) is an edge which coincides or is synchronized with an external bus clock active edge and therefore the identified CLK edge may be used for bus operations. The CLKEN* signal may be periodic or non-periodic. The address/data and control to and from the bus controller (as illustrated) is transferred in response to the identified CLK edge.

Figure 2:
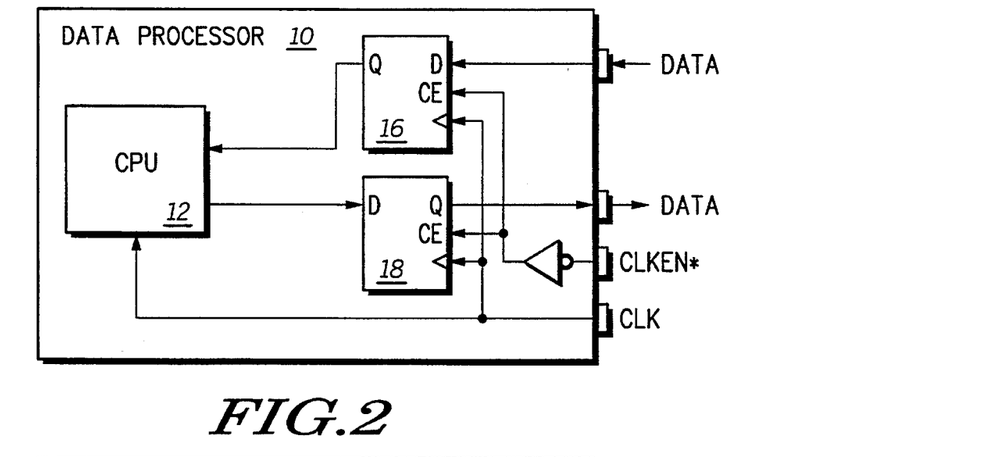
FIG. 2 illustrates, in a block diagram, another data processing system in accordance with the present invention.

FIG. 2 illustrates how the CLKEN* signal synchronizes incoming and outgoing control/data/address information labeled generically in FIG. 2 as "DATA". FIG. 2 illustrates a D flip-flop 16 and a D flip-flop 18. D flip-flop 18 is used as output and D-flip-flop 16 is used as input. Given the flip-flops 16 and 18 it should be apparent that the circuit of FIG. 2 may be multiplexed or tri-stated selectively to form a single input/output I/O pin. Furthermore, other flip-flops and storage elements are known in the art and may be used in place of the flip-flops 16 and 18.

The CLK signal is input to the flip-flops 16 and 18 and the CPU 12. The data within the flip-flops 16 and 18 is not changed unless a clock (CLK) edge is experienced along with an asserted CE (clock enable) which is coupled to CLKEN*. The assertion of CLKEN* around an active edge of an external bus clock allows the processor to receive and transmit "DATA" at the external bus frequency while processing internal data and performing internal processor operations at the CLK speed.

Figure 3:
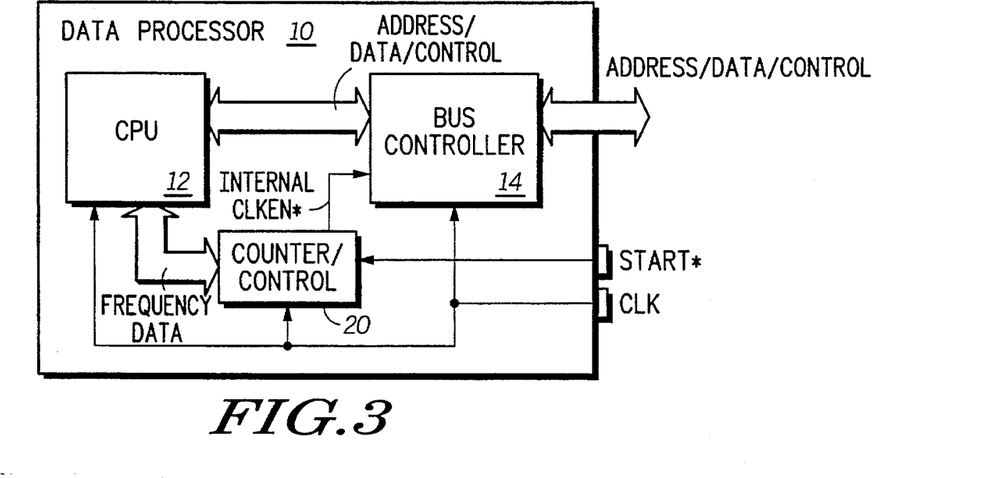
FIG. 3 illustrates, in a block diagram, yet another data processing system in accordance with the present invention.

FIG. 3 illustrates that the CLKEN* signal may be internally generated by the processor once the processor has received an external START* signal. FIG. 3 illustrates the CPU 12, the bus controller 14 and a counter/control circuit 20. The counter/control circuit 20 receives as input the CLK and the START* external signal. The counter/control circuit 20 either is programmed to know the CLK-to-external bus clock ratio or is provided with information identifying the CLK-to-external bus clock ratio. The counter/control circuit 20 receives one assertion of the external START* signal which identifies one active edge of the external bus clock. The counter/control circuit 20 then uses the ratio information to continuously generate internal CLKEN* signals to identify active edges which may be used for bus operations without further need of the external START*.

For example, assume that the clock (CLK) is running at 20 MHz and the external bus clock is running at 5 MHz. The ratio of 200 MHz/5 MHz is four and therefore the bus is running in a one-quarter mode of operation. The counter/control circuit 20 is given the information (via FREQUENCY DATA) that four clock cycles of CLK occurs for every clock cycle of the external bus clock. FREQUENCY DATA may be provided from external to the data processor 10 via the address/data/control bus. The external START* signal identifies the first external bus clock active edge and the counter/control circuit 20 loads a register with the number three for example. Four clocks are experienced wherein three is decremented to two, then one, then zero. Once zero is reached, four CLK cycles have occurred and the counter/control circuit 20 asserts the internal CLKEN*. Three is once again loaded into the counter/control circuit 20 and the process of counting down to zero begins again to generate the next assertion of the internal CLKEN*. Either decrementing or incrementing may be used. Instead of a counter, a ring counter, a state machine, or a like storage element may be used to generate the internal CLKEN* signals. Also, a counter or a ring counter may be programmed to perform periodic or non-periodic assertions of the internal CLKEN*.

Figure 4:
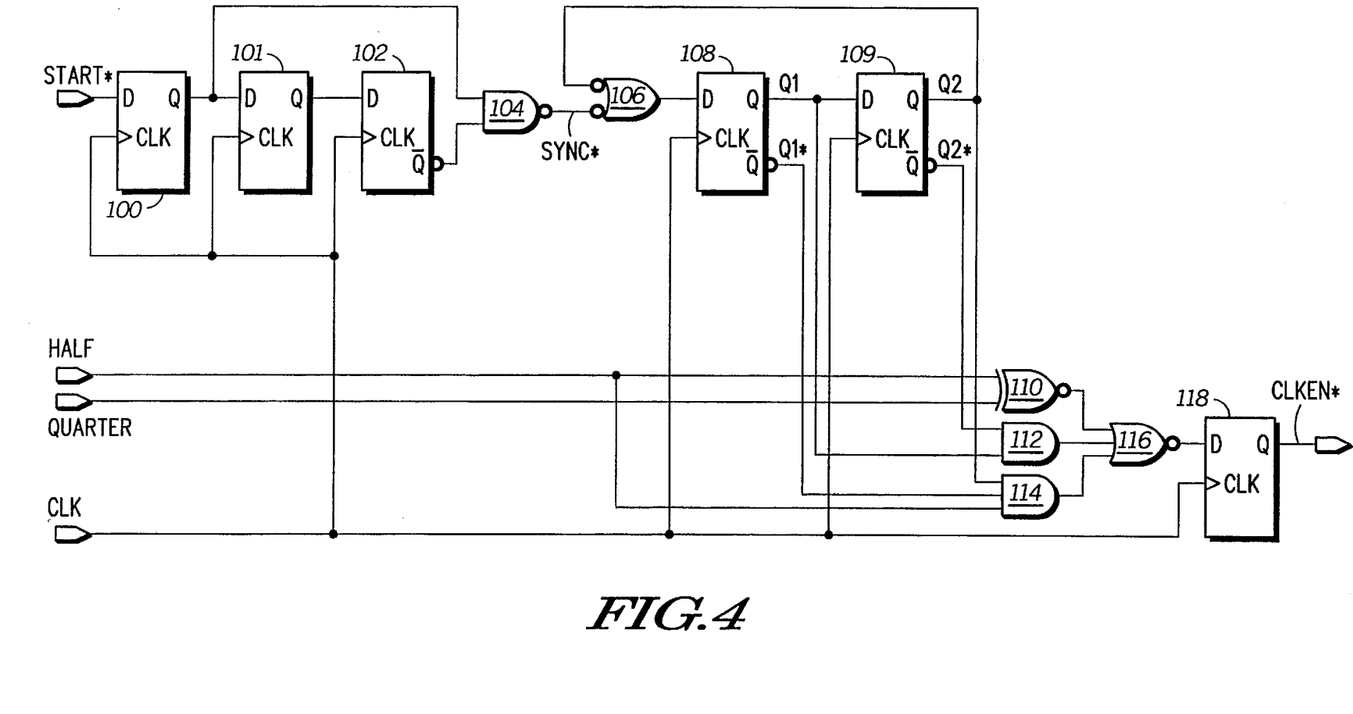
FIG. 4 illustrates, in a block diagram, a control circuit for operating a bus at one-quarter and one-half speed of the data processor clock in accordance with the present invention.

FIG. 4 illustrates a circuit for achieving full, half, or one-quarter mode of bus operation within a data processing system. Generically, FIG. 4 illustrates one example of a circuit which can be used to generate the internal or external CLKEN* signal. For full speed operation (CLKEN* continuously asserted), the HALF and QUARTER signals will both be continuously negated which will cause the output of Exclusive-NOR gate 110 to be continuously asserted to a logic one. This continuous logic one output from Exclusive-NOR gate 110's output is enough to cause NOR gate 116's output to be continuously asserted to a logic zero which when staged through D flip-flop 118 causes CLKEN* to be continuously asserted to a logic zero. Therefore, every active (rising, in this case) clock edge of the clock CLK is used to perform bus operations and the bus and processor run at equal speeds.

For the assertion of CLKEN* every other CLK period (Half speed operation), or every fourth CLK period (Quarter speed operation), the negation point of the START* input is important to properly synchronize the assertion of CLKEN* just before, and the negation of CLKEN* just after, the proper CLK edge which is coincident with the rising edge of a half speed or quarter speed system clock. In other words, START* is used to align the assertion of CLKEN* so that the CLKEN* signal is asserted for a time period which coincides with an active edge (rising edge, in this case) of the CLK signal.

To accomplish this correct operation and synchronization of CLKEN*, D flip-flops 100, 101 and 102 are used to generate a SYNC* pulse. START* is staged or delayed by one CLK period through D flip-flop 100 which is then staged or delayed through D flip-flop 101 and finally staged or delayed through D flip-flop 102. The Q output of D flip-flop 100 is then ANDed with the inverted output of D flip-flop 102 to generate the SYNC* pulse which is first asserted one CLK period after START* negates, held for two CLK periods, and then negated.

Negative input OR-gate 106 and D flip-flops 108 and 109 form a circular feedback oscillator since negative input OR-gate 106 acts as an inverting element and D flip-flops 108 and 109 form staging elements. With the two levels of staging by D flip-flops 108 and 109, the outputs of D flip-flops 108 and 109 have a frequency of one fourth the CLK frequency. Further, since the Q1 output of D flip-flop 108 is connected to the D input of D flip-flop 109, the outputs of D flip-flop 109 will be out-of-phase with the outputs of D flip-flop 108, with the outputs of D flip-flop 109 lagging the outputs of D flip-flop 108 by 90-degrees, i.e., one CLK period.

The SYNC* signal is connected to the other input of negative input OR-gate 106 to control the placement or relationship in time between the outputs of D flip-flops 108 and 109 and the rising edges of CLK which align with the rising edges of the system clock. SYNC* stays asserted for two CLK periods and forces the output of negative input OR-gate 106 to a logic one. This forcing of a logic one into D flip-flop 108, and subsequently D flip-flop 109, causes the sequence of oscillation of the outputs of D flip-flops 108 and 109 to sync-up to the time when the SYNC* pulse is asserted. For either half or quarter speed operation, Exclusive-OR gate 110 will output a logic zero since either the HALF or QUARTER signals will be asserted, but not both. Thus, the output of Exclusive-OR gate 110 will have no effect on when the CLKEN* is asserted for these clock speeds. In quarter speed operation, HALF will be negated and the output of AND-gate 114 will be negated and the output of AND-gate 114 also will not have an effect on when CLKEN* is asserted. In quarter and half speed modes of operation, AND-gate 112 combines the inverted Q output, Q2*, of D flop-flop 109 with the non-inverted Q output, Q1, of D flip-flop 108.

To properly synchronize CLKEN* about the proper rising edges of CLK and the system clock, START* must negate just after a rising edge of CLK which coincides with a rising edge of the system clock. When START* negates, SYNC* will assert one CLK period later; Q1 will assert one CLK period after SYNC* asserts; and Q2 will assert one CLK period after Q1 asserts. Q1 and Q2 are periodic with a 50% duty cycle and will assert and negate with a frequency equal to one-fourth the frequency of CLK. The output of AND-gate 112 asserts each time Q1 is asserted and Q2 is negated. This first occurs on the third CLK period after START* was negated and periodically happens at a frequency of one fourth the frequency of CLK. The output of AND-gate 112 stays asserted for only one CLK period because Q2 lags Q1 by a single CLK period, i.e., the output of AND-gate 112 has a 25% duty cycle and a period of one-fourth the frequency of CLK. The output of AND-gate 114 is conditional on the state of HALF; if HALF is negated this output will be negated. AND-gate 114 combines the inverted output, Q1, of D flip-flop 108 with the non-inverted output of D flip-flop 109, Q2. The output of AND-gate 114 will only be asserted when half speed mode is enabled, with the assertion of HALF, and when Q1 is negated and Q2 is asserted. This first occurs on the fifth CLK period after START* was negated and periodically happens at a frequency of one fourth the frequency of CLK. The output of AND-gate 114 stays asserted for only one CLK period because Q2 lags Q1 by a single CLK period, i.e., the output of AND-gate 114 has a 25% duty cycle and a period of one-fourth the frequency of CLK. Note that the assertion of the output of AND-gate 114 lags the output of AND-gate 112 by two CLK periods.

In quarter speed mode, only AND-gate 112 will be active. NOR-gate 116 will invert AND-gate 112's output and stage it through D flip-flop 118. Since AND-gate 112's output is asserted starting three CLK periods after START* negated, and therefore three CLK periods from when the CLK and system clock edges coincided, it will assert one CLK before the next alignment of the CLK and system clock edges. D flip-flop 118 then stages or delays the output of NOR-gate 116 by one CLK period to produce CLKEN* which asserts for one CLK period just before the CLK period in which CLK and the system clock edges align.

In half speed mode, AND-gates 112 and 114 are both active. NOR-gate 116 ORs and inverts the outputs of AND-gate 112 and 114 to produce a signal that has a frequency of one-half the frequency of CLK and then stages this signal through D flip-flop 118. Since AND-gate 112's output is asserted starting three CLK periods after START* negated, and therefore three CLK periods from when the CLK and system clock edges coincided, it will assert one CLK before the second alignment of the CLK and system clock edges. D flip-flop 118 then stages or delays the output of NOR-gate 116 by one CLK period to produce CLKEN* which asserts for one CLK period just before the CLK period in which CLK and the system clock edges align. Since AND-gate 114's output asserts five CLK periods after START* negated, NOR-gate 116's output will assert one CLK before the next alignment of the CLK and system clock edges in half speed mode. D flip-flop 118 again stages or delays the output of NOR-gate 116 by one CLK period to produce CLKEN* which asserts for one CLK period just before the CLK period in which CLK and the system clock edges align. Since the output of AND-gates 112 and 114 are periodic but out-of-phase the combination of these outputs by NOR-gate 116 will cause CLKEN* to be asserted every other CLK period in half speed mode. It is important to note that the signal START* may be a function of reset, may be user invoked, or the like.

FIG. 5 illustrates a timing diagram for the circuit of FIG. 4. CLK is the internal processor clock and the external bus clock in FIG. 5. START*, SYNC*, HALF, QUARTER, Q1, Q2, CLK, and CLKEN* are illustrated and discussed in FIG. 4. In FIG. 5 the bus is operating at a frequency which is equal to the speed of the CLK internal clock (i.e., full speed operation). In this case, the internal CLKEN* signal is held at an asserted active low value so that every active rising edge of the CLK signal is used for bus operations. The internal CLKEN* signal is held asserted via the Exclusive NOR gate 110 because the HALF and QUARTER signals are both low (logic zero) in full speed mode.

FIG. 6 illustrates another timing diagram for the circuit of FIG. 4. SYS_CLK is the system external bus clock while CLK is the internal processor clock. START*, SYNC*, HALF, QUARTER, Q1, Q2, CLK, and CLKEN* are illustrated and discussed in FIG. 4. In FIG. 6 the bus is operating at a frequency which is one-half the frequency of the CLK internal clock (i.e., one-half speed operation). In this case, the internal CLKEN* signal is toggled so that every other rising active edge of the CLK signal is selected for bus use. The internal CLKEN* signal is toggle asserted via the gates 110, 112, 114, and 116 because the HALF signal is logic one and the QUARTER signal is logic zero. CLKEN* is only asserted if both Q1 and Q2 are asserted or both Q1 and Q2 are not asserted (Note: CLKEN* is active low and asserted when a logic zero.

FIG. 7 illustrates yet another timing diagram for the circuit of FIG. 4. SYS_CLK is the system external bus clock while CLK is the internal processor clock. START*, SYNC*, HALF, QUARTER, Q1, Q2, CLK, and CLKEN* are illustrated and discussed in FIG. 4. In FIG. 7 the bus is operating at a frequency which is one-quarter the frequency of the CLK internal clock (i.e., one-quarter speed operation). In this case, the internal CLKEN* signal is toggled so that every fourth rising active edge of the CLK signal is selected for bus use. The internal CLKEN* signal is toggle asserted via the gates 110, 112, 114, and 116 because the HALF signal is logic zero and the QUARTER signal is logic one. CLKEN* is only asserted if both Q1 and Q2 are asserted.

It is important to note that, the relationship between the bus clock and the processor clock may change dynamically. For example, the system may run at half speed for a time period and run at full speed in another time period and the like. Other circuits may allow the CLKEN* signal to be asserted before the rising edge of the processor clock that coincides with the rising edge of the external bus clock (SYS_CLK) and is negated before all rising edges of the processor clock that do not coincide with a rising edge of the external bus clock and still be within the spirit and scope of this invention.

While the present invention has been illustrated and described with reference to specific embodiments, further modifications and improvements will occur to those skilled in the art. For example, bus sizes and speeds may vary significantly. The counter/control circuit 20 may vary in design but maintain the same function. The circuit of FIG. 4 may be altered to support other operational bus speeds and may be either periodic, non-periodic, random, or pseudo-random in it's assertion of the CLKEN*. It is important to note that outputs of the data processor taught herein may be designed so that they change state in a time interval that is not synchronous to a CLKEN* clock edge in some cases. It is to be understood, therefore, that this invention is not limited to the particular forms illustrated and that it is intended in the appended claims to cover all modifications that do not depart from the spirit and scope of this invention.

What is claimed is:

1. An integrated circuit having at least one terminal coupled to a bus, the integrated circuit comprising:

a terminal for receiving a clock signal, the clock signal having a plurality of active clock edges; and a terminal for receiving a clock qualifier signal, the clock qualifier signal being asserted to indicate at least one active clock edge in the plurality of active clock edges, wherein the at least one active dock edge in the plurality of active clock edges is used to indicate when the integrated circuit is to perform at least one bus operation external to the integrated circuit, wherein the integrated circuit has some terminals which are qualified by the clock qualifier signal to perform bus operations and other terminals which function independently from the clock qualifier signal.

2. The integrated circuit of claim 1 wherein the clock qualifier signal is asserted for a time period during which an active edge of an external bus clock is occurring.

3. The integrated circuit of claim 1 wherein the bus operations are operations selected from a group consisting of: bus read operations and bus write operations.

4. The integrated circuit of claim 1 wherein the clock qualifier signal is asserted either in a periodic pattern, a non-periodic pattern, a random pattern, or a pseudo-random pattern.

5. The integrated circuit of claim 1 wherein the clock qualifier signal is asserted once, the one assertion of the clock qualifier signal starting a count circuitry internal to the integrated circuit, the count circuitry generating either a periodic control signal or a non-periodic control signal which when asserted indicates active bus clock edges in the plurality of active clock edges, wherein the active bus clock edges in the plurality of active clock edges are used to indicate when the integrated circuit is to perform bus operations external to the integrated circuit.

6. The integrated circuit of claim 5 wherein the active bus clock edges occur less frequently than the plurality of active clock edges.

7. The integrated circuit of claim 5 wherein the active bus clock edges are numerically a factor of the plurality of active clock edges.

8. An integrated circuit having at least one terminal coupled to a bus, the integrated circuit comprising:

a terminal for receiving a clock signal, the clock signal hating a plurality of active clock edges; and a terminal for receiving a clock qualifier signal, the clock qualifier signal being asserted to indicate at least one active clock edge in the plurality of active clock edges, wherein the at least one active clock edge in the plurality of active clock edges is used to indicate when the integrated circuit is to perform at least one bus operation external to the integrated circuit, wherein the clock qualifier signal is asserted once, the one assertion of the clock qualifier signal starting count circuitry internal to the integrated circuit, the count circuitry generating either a periodic control signal or a non-periodic control signal which when asserted indicates active bus clock edges in the plurality of active clock edges, wherein the active bus clock edges in the plurality of active clock edges are used to indicate when the integrated circuit is to perform bus operations external to the integrated circuit.

9. A data processor comprising:

a central processing unit (CPU) for manipulating data within the data processor;

circuitry coupled to the CPU for receiving a clock signal having a plurality of active edges and for receiving a control signal;

a first terminal for receiving the clock signal, the clock signal being communicated to the circuitry; and a second terminal for receiving the control signal, the control signal being asserted to indicate which active edges within the plurality of active edges may be used for operations between the bus and the data processor.

10. The data processor of claim 9 wherein each of the plurality of active edges in the clock signal are used to perform central processing unit (CPU) operations and the assertion of the control signal is used to indicate which of the active edges within the plurality of active edges may be used for operations between the bus and the data processor wherein the active edges within the plurality of active edges which may be used for operations between the bus and the CPU occur less frequently or as frequently as the active edges in the clock signal which are used to perform central processing unit (CPU) operations.

11. The data processor of claim 10 wherein the active edges within the plurality of active edges which may be used for operations between the bus and the data processor is a number which is a numerical factor of the number of active edges in the clock signal which are used to perform central processing unit (CPU) operations in a fixed period of time.

12. The data processor of claim 9 wherein the control signal is asserted once to both start a counter circuit internal to the data processor and indicate a first active edge within the plurality of active edges which may be used to perform operations between the bus and the data processor, the counter circuit indicating all active edges which may be used to perform operations between the bus and the CPU after the first active edge is identified by the control signal.

13. The data processor of claim 12 wherein the counter circuit is loaded with a count value, the counter circuit counting from the count value to a predetermined value wherein the mathematical difference between the count value and the predetermined value is equal to the number of active edges required from the clock signal before the counter circuit is to identify an active edge which may be used to perform operations between the bus and the data processor.

14. The data processor of claim 9 wherein the bus operations are performed in response to a bus clock external to the data processor, the bus clock operating at a frequency which is less than or equal to a frequency of the clock signal, the assertion of the control signal being used internal to the data processor to align an active edge of the bus clock to an active edge of the clock signal to synchronize external bus operations with the CPU.

15. The data processor of claim 14 wherein the clock signal is operating at a frequency F and the bus clock external to the data processor operates at a frequency which is selected from the group consisting of: F, F/2, and F/4.

16. A data processor comprising:
a central processing unit (CPU) for manipulating data within the data processor;
bus control circuitry coupled to the CPU for receiving a clock signal having a plurality of active edges and for receiving a control signal;
a first terminal for receiving the clock signal, the clock signal being communicated to the bus control circuitry; and
a second terminal for receiving the control signal, the clock signal being used to control the operation of the central processing unit (CPU) and the clock signal along with the control signal being used together to determine when the bus circuitry and the data processor are to communicate.

17. The data processor of claim 16 wherein the bus control circuitry is used to control the operations of an external bus which has operational access to a bus clock operating at a first frequency, the clock signal operating at a second frequency wherein the second frequency is equal to or greater than the first frequency, the control signal being asserted to indicate an active edge of the clock signal which coincides with an active edge of the bus clock.

18. A data processor comprising:
a central processing unit (CPU) for manipulating data within the data processor;
bus control circuitry coupled to the CPU for receiving a clock signal having a plurality of active edges and for receiving a control signal;
a first terminal for receiving the clock signal, the clock signal being communicated to the bus control circuitry; and
a second terminal for receiving the control signal, the clock signal having N active clock edges within a specific time frame which are used to control the operation of the central processing unit (CPU) and the clock signal along with the control signal defining M active clock edges within the specific time frame wherein the M active clock signals are used to initiate a plurality of bus operations, N and M are finite integers greater than zero wherein N≧M.

19. The data processor of claim 18 wherein the value M is equal to a value selected from the group consisting of: N, N/2, N/4, and a numerical factor of N.

20. An integrated circuit comprising:
a central processing unit (CPU);
a terminal for receiving data from at least one bit line of a bus, the data being transferred to the CPU;
a terminal for receiving a clock signal, the clock signal having a plurality of active edges;
a terminal for receiving an external control signal, the external control signal being asserted once; and
a circuit having an input for receiving the control signal, the circuit beginning to repeatedly assert an internal control signal in response to the assertion of the external control signal, the internal control signal being asserted to indicate which active edge of the clock signal may be used to perform write or read operations between the data processor and the bus, while the active edges of the clock signal are used to perform operations internal to the CPU.

21. A data processing system comprising:
a bus;
an integrated circuit having:
bus circuitry coupled to the bus;
a central processing unit (CPU) coupled to the bus circuitry;
a terminal for receiving a CPU clock signal, the CPU dock signal having a plurality of active clock edges; and
a terminal for receiving a control signal, the control signal being asserted to indicate at least one active clock edge in the plurality of active clock edges, wherein the at least one active clock edge in the plurality of active clock edges is used to indicate when the integrated circuit is to perform write or read operations between the bus circuitry and the CPU;
a system bus clock signal for controlling bus operations, the system bus clock signal having active edges which coincide with the assertion of the control signal, the assertion of the control signal identifying an active edge of the CPU clock signal which coincides with the active edge of the system bus clock signal.

22. A data processor comprising:
a bus;
an integrated circuit having:
bus circuitry coupled to the bus;
a central processing unit (CPU) coupled to the bus circuitry;
circuitry for generating a CPU clock signal within the data processor, the CPU clock signal having a plurality of active clock edges; and
a terminal for receiving a control signal, the control signal being asserted to indicate at least one active clock edge in the plurality of active clock edges, wherein the at least one active clock edge in the plurality of active clock edges is used to indicate when the integrated circuit is to perform write or read operations between the bus circuitry and the CPU;

a system bus clock signal for controlling bus operations, the system bus clock signal having active edges which coincide with the assertion of the control signal, the assertion of the control signal identifying an active edge of the CPU clock signal which coincides with the active edge of the system bus clock signal.

23. A method for using a single clock signal to control a processor at a first frequency and to control a bus controller which performs bus operations at a second frequency, the bus controller and the processor residing within a data processor, the method comprising the steps of:

receiving the single clock signal from external to the data processor, the single clock signal operating at the first frequency and having active edges; and receiving a control signal from external to the data processor, the control signal being used to indicate which active edges of the single clock signal are used to perform bus operations, the active edges of the clock signal which are used to perform bus operations resulting in the second frequency wherein the second frequency is less than or equal to the first frequency.

24. The method of claim 23 wherein the step of receiving a control signal further comprises the step of:

asserting the control signal once to start an internal counter circuit, the internal counter circuit generating an internal control signal, the internal control signal being used to identify active edges of the clock signal which coincide to active edges of an external bus clock.

25. The method of claim 24 wherein the step of asserting the control signal once to start an internal counter circuit further comprises the step of:

loading the counter circuit with a first numerical value which is to be either decremented or incremented to a second numerical value wherein the quantity (first numerical value— the second numerical value) is the number of active edges of the clock signal which are experienced between active edges of the external bus clock.

26. The method of claim 23 wherein the bus operations are controlled by an external bus clock and the step of receiving a control signal further comprises:

asserting the control signal for time periods which coincide with the active edges of the external bus clock so that active edges of the clock signal internal to the processor coincide with the active edges of the external bus clock are identified.

27. The method of claim 23 wherein the step of receiving the single clock signal from external the data processor comprises:

selecting the active edges from a group consisting of: rising edges, falling edges, and a combination of rising edges and falling edges.

* * * * *